United States Patent
Gu et al.

(10) Patent No.: US 6,584,249 B1
(45) Date of Patent: Jun. 24, 2003

(54) MINIATURE OPTICAL DISPERSION COMPENSATOR WITH LOW INSERTION LOSS

(75) Inventors: Shijie Gu, Sunnyvale, CA (US); Zhanxiang Zhang, San Jose, CA (US); Yanfeng Yang, Sunnyvale, CA (US)

(73) Assignee: OpLink Communications, Inc., San Jose, CA (US)

( * ) Notice: Subject to any disclaimer, the term of this patent is extended or adjusted under 35 U.S.C. 154(b) by 0 days.

(21) Appl. No.: 09/982,522

(22) Filed: Oct. 17, 2001

(51) Int. Cl.⁷ .................................................. G02B 6/26
(52) U.S. Cl. ............................. 385/47; 372/6; 372/102; 359/130
(58) Field of Search ............................. 385/15, 16, 24, 385/27, 28, 37, 123; 435/173.1; 430/8; 372/102, 6, 96; 359/130, 566, 573, 577, 161, 173, 900

(56) References Cited

U.S. PATENT DOCUMENTS

| | | | |
|---|---|---|---|
| 5,023,947 A | | 6/1991 | Cimini, Jr. et al. .......... 455/619 |
| 5,557,468 A | | 9/1996 | Ip .............................. 359/615 |
| 6,304,696 B1 | * | 10/2001 | Patterson et al. .............. 385/37 |
| 6,316,153 B1 | * | 11/2001 | Goodman et al. .............. 430/8 |
| 6,321,005 B1 | * | 11/2001 | Satorius ....................... 385/28 |
| 6,356,684 B1 | * | 3/2002 | Patterson et al. ............. 385/37 |
| 6,404,956 B1 | * | 6/2002 | Brennan et al. ............... 385/37 |
| 2002/0006648 A1 | * | 1/2002 | Goodman et al. ....... 435/173.1 |
| 2002/0102052 A1 | * | 8/2002 | Thompson et al. ........... 385/27 |

* cited by examiner

Primary Examiner—Akm E. Ullah
(74) Attorney, Agent, or Firm—Lumen Intellectual Property Services, Inc.

(57) ABSTRACT

The present invention provides an optical dispersion compensator with relatively small size and low insertion loss comprising a Fabry-Perot etalon and a dual-fiber collimator having a dual-fiber pigtail and a GRIN lens. The dual-fiber pigtail has an input fiber and an output fiber. An optical signal is coupled into the input fiber and then collimated by the GRIN lens into a collimated incident beam that is incident on the Fabry-Perot etalon with an incident angle. The collimated incident beam is reflected back by the Fabry-Perot etalon into a collimated reflected beam that is collected by the GRIN lens and coupled into the output fiber. By adjusting the separation between the input fiber and the output fiber of the dual-fiber pigtail, the collimated incident beam will change its incident angle and reflected angle. By tuning this angle, the group delay pattern of the output optical signal through the output fiber will shift along with wavelength, therefore dispersion compensation can be achieved. The insertion loss of the optical dispersion compensator is as low as 0.25 dB. It is also possible to cascade two or more optical dispersion compensators together to form an optical dispersion compensation system.

46 Claims, 14 Drawing Sheets

MINIATURE OPTICAL DISPERSION COMPENSATOR WITH LOW INSERTION LOSS

FIELD OF INVENTION

The present invention relates to optical dispersion compensator, and in particular to a miniature optical dispersion compensator with low insertion loss by combining a dual-fiber collimator and an etalon into a single small device.

BACKGROUND OF THE INVENTION

Rapid recent progress in the development of erbium doped fiber amplifiers (EDFA) has made possible ultra-long-distance optical transmission without the use of regenerative repeaters. Chromatic dispersion of single-mode optical fiber has becomes a bottleneck for high-speed long-haul optical transmission systems. It is known that selected optical fibers with opposite dispersion can be used for equalizing group-delay incurred by optical signals traveling over a long distance. Dispersion-compensating fiber (DCF) are designed such that the wave-guide dispersion is enhanced by modifying the fiber refractive profile so that it becomes greater than the material dispersion. Based on this method, very long length of dispersion-compensating fiber will be required to compensate the dispersion of an even modest length of a transmission fiber. Also, an optical amplifier will be needed to compensate for the insertion loss of the dispersion-compensating fiber (DCF), which is generally higher than that of conventional single mode fiber.

Other methods include the use of chirped fiber Bragg gratings, and the use of planar light-wave circuits. Fiber Bragg gratings are generally not practical for field applications due to their relatively narrow bandwidth, and relatively fixed wavelength. Planar wave-guide circuits (PLC) are also of relatively narrow bandwidth, and relatively difficult to be fabricated. MEMS technology has attracted many attentions in tunable dispersion compensating filter. Although MEMS (Micro Electro Mechanical System) based dispersion compensating device can be designed and fabricated with tunable function, they are not quite mature and cost-effective in the current stage.

U.S. Pat. No. 5,023,947 discloses an optical equalization receiver comprising a reflective Fabry-Perot etalon and a piezoelectric transducer for dynamically controlling the optical path length of the etalon. The reflected signal from the Fabry-Perot etalon with a rear reflective mirror of 100% reflectivity has a Lorentzian group delay response with optical frequency. By tuning the etalon such that its dispersion has appropriate sign and magnitude at the optical signal wavelength, dispersion compensation can be achieved. Since this is a reflective device, a 3 dB coupler or an optical circulator would be required to separate input and output signals.

U.S. Pat. No. 5,557,468 discloses a Similar two-port Fabry-Perot etalon bsaed design for dispersion compensation. The difference between this design and the above reflective based Fabry-Perot resonator design is that the rear mirror's reflectivity is not exact 100%. It is a little bit lower than 100% for the output port monitoring. The advantages of this design are two folds: (1) it provides a device with a monitoring port on the transmitted side of the etalon, and the amplitude response of the monitor port provides a much higher signal contrast ratio; and (2) The local control scheme allows the compensation device to be located virtually anywhere in the system, even at the transmitter end.

But all these two designs need a 3 db coupler or an optical circulator to separate the input signal and the compensated signal. That will increase the insertion loss, and at the same time increase the cost of the device or system. In order to tune the etalon cavity to locate the ITU (International Telecommunication Union) wavelength position, piezo-electric and MEMS actuator have been used to adjust the cavity length, which further increases the complexity and cost of the optical system.

For foregoing reasons, it would be an advance in the art to provide an optical dispersion compensator that eliminates the use of a 3 dB coupler or an optical circulator. It is an especially welcome advance to provide a miniature optical dispersion compensator with low insertion loss by combining a dual fiber collimator and an etalon into a single small device.

OBJECTS AND ADVANTAGES

It is a primary object of the present invention to provide an optical dispersion compensator for a predetermined range of wavelengths with relatively small size and low insertion loss. The compensator has a Fabry-Perot etalon and a dual-fiber collimator having a dual-fiber pigtail and a GRIN lens. At least one negative dispersion region can be obtained in the output response of the optical dispersion compensator and dispersion compensation can be achieved. The insertion loss of the optical dispersion compensator can be as low as 0.25 dB.

It is a further object of present invention to provide an optical dispersion compensation system for a predetermined range of wavelengths comprising a plurality of optical dispersion compensators with same or different optical parameters to obtain at least one negative dispersion region. By cascading two or more optical dispersion compensators together, it is possible to extend the range of the output response considerably with respect to both time delay and operating wavelengths. A two-stage optical dispersion compensation system can reach an insertion loss as low as 0.5 dB.

It is yet another object of the present invention to provide a method of fabricating an optical dispersion compensator for a predetermined range of wavelengths with low insertion loss to obtain at least one negative dispersion region. The phase shift of the optical dispersion compensator can be adjusted and the middle wavelength of the predetermined range of wavelength can be located at the middle of the negative dispersion region.

These and numerous other objects and advantages of the present invention will become apparent upon reading the detailed description.

SUMMARY

In accordance with the present invention, an optical dispersion compensator for a predetermined range of wavelengths has a Fabry-Perot etalon and a dual-fiber collimator is provided. The Fabry-Perot etalon has a front reflective mirror and a rear reflective mirror in a parallel spaced relationship to form a cavity between the reflective mirrors. The reflectivity of the front reflective mirror is substantially smaller than the reflectivity of the rear reflective mirror. The reflectivity of the rear reflective mirror is substantially 100%, or between 97% and 100%. The dual-fiber collimator has a dual-fiber pigtail and a GRIN lens. The dual-fiber pigtail has an input fiber and an output fiber. An optical signal is coupled into the input fiber and then collimated by the GRIN lens into a collimated incident beam which is incident on the Fabry-Perot etalon with an incident angle. The collimated incident beam is reflected back by the Fabry-Perot etalon into a collimated reflected beam which is collected by the GRIN lens and then coupled into the output fiber.

By adjusting the separation between the input fiber and the output fiber of the dual-fiber pigtail, the collimated incident beam will change its incident angle and reflected angle. By tuning this angle, the group delay pattern of the output optical signal through the output fiber will shift along with wavelength and the middle wavelength of the predetermined range of wavelengths can be located in the downturn slope range of the group delay pattern (or in other words, in the negative dispersion region) therefore dispersion compensation can be achieved. Generally, the middle wavelength of the predetermined range of wavelengths can be any ITU wavelength corresponding to an ITU channel or other operating wavelengths in the art. By aligning the dual-fiber pigtail and the GRIN lens, the insertion loss of the optical dispersion compensator can reach as low as 0.25 dB.

In accordance with the present invention, the front reflective mirror and the rear reflective mirror of the optical dispersion compensator can be two side surfaces of a solid substrate coated with reflective films.

The optical dispersion compensator of the present invention further has a spacer made of highly temperature stable material, e.g. Zerodur glass. Under this situation, the end surface of the GRIN lens is used as the front reflective mirror, the rear reflective mirror can be a coated mirror. The etalon cavity is filled with air and the spacer is positioned between the front reflective mirror and the rear reflective mirror to assure the length of the cavity.

The optical dispersion compensator of the present invention further has a tube holding the GRIN lens. The tube has a same temperature coefficient as that of the GRIN lens. Similarly, the end surface of the GRIN lens is used as the front reflective mirror and the rear reflective mirror can be a coated mirror. The etalon cavity is filled with air and the spacer is positioned between the end surface of the tube and the rear reflective mirror to assure the length of the cavity.

In accordance with the present invention, there is further provided an optical dispersion compensation system for a predetermined range of wavelengths comprising a plurality of optical dispersion compensators with same or different optical parameters to obtain at least one negative dispersion region. By cascading two or more optical dispersion compensators of the present invention together, it is possible to extend the range of the output response considerably with respect to both time delay and operating wavelengths. In accordance with one aspect of the present invention, it is provided an optical dispersion compensation system by cascading together two optical dispersion compensators of the present invention with different optical parameters. The two-stage optical dispersion compensation system can reach an insertion loss as low as 0.5 dB.

In accordance with another aspect of the present invention, a method for fabricating an optical dispersion compensator for a predetermined range of wavelengths is provided, comprising coating the front surface and the rear surface of a etalon, fixating a GRIN lens with the etalon, choosing a dual-fiber pigtail having a input fiber and a output fiber with a predetermined separation between them, aligning the dual-fiber pigtail with the GRIN lens fixated with the etalon, and fixating the dual-fiber pigtail with the GRIN lens fixated with the etalon. At least one negative dispersion region can be achieved in the output response of the compensator.

The method of the present invention can further comprise a step of machining the etalon into an adaptable size to the diameter of the GRIN lens.

The step of fixating the GRIN lens with the etalon of the method of the present invention can further comprise applying an adhesive, e.g. UV glue or epoxy glue (e.g. 353 NDTQ). So can the step of fixating the dual-fiber pigtail with the GRIN lens fixated with the etalon.

The step of aligning the dual-fiber pigtail with the GRIN lens fixated with the etalon can further comprise coupling an light source into the input fiber and coupling the optical signal from the output fiber into a optical spectral analyzer, such that the phase shift of the optical dispersion compensator can be adjusted and the middle wavelength of the predetermined range of wavelengths can be located substantially in the middle of the negative dispersion region.

Advantageously, the present invention eliminates the use of a 3 dB coupler or an optical circulator in the prior arts, which not only simplifies and minimizes the overall system but also substantially lowers the cost. Also, the optical dispersion compensator of the present invention can achieve an insertion loss as low as 0.25 dB, which makes the application of multiple-stage optical dispersion compensation system possible and practical.

The above summary of the present invention is not intended to describe each disclosed embodiment or every implementation of the present invention. The figures and the detailed description below will more particularly exemplify these embodiments.

Figure 1A:
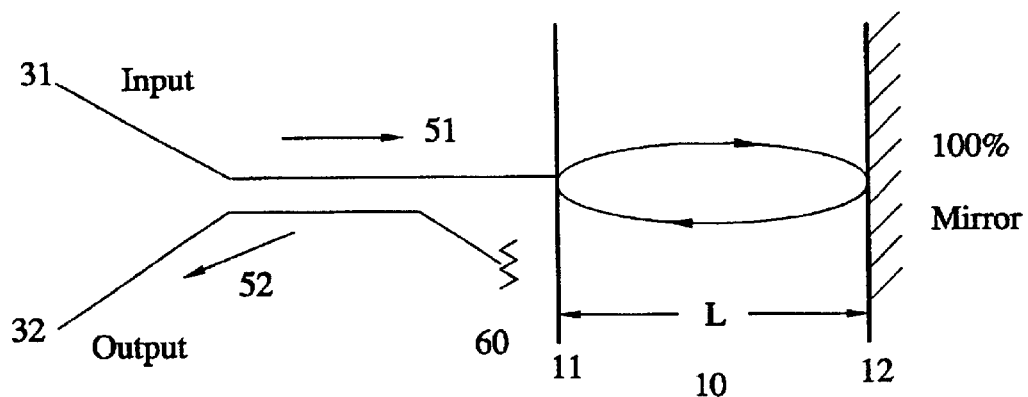
FIG. 1a is a schematic illustration of a reflective Fabry-Perot etalon based optical dispersion compensator in the prior art.

While the invention is amendable to various modifications and alternative forms, specifies thereof have been shown by way of examples in the drawings and will be described in detail. It should be understood, however, that the intention is not to limit the present invention to the particular embodiments described. On the contrary, the intention is to cover all modifications, equivalents, and alternatives falling within the spirit and scope of the present invention.

DETAILED DESCRIPTION

FIG. 1a is a schematic illustration of a reflective Fabry-Perot etalon based dispersion compensator 100 in the prior art. The Fabry-Perot etalon 10 has a front partially reflective mirror 11 spaced apart in a parallel relationship with a rear 100% reflective mirror 12. An input optical signal 51 is coupled into an input fiber 31 and the reflected output signal 52 after going through the Fabry-Perot etalon 10 is transmitted outward through an output fiber 32. A piezo-electric transducer (not shown) is used to dynamically control the optical path length of the Fabry-Perot etalon 10. By tuning the cavity length L of the Fabry-Perot etalon 10 such that its dispersion has appropriate sign and magnitude at the optical signal wavelength, dispersion compensation can be achieved. As it is a normal reflective device, a 3 dB coupler 60 or an optical circulator (not shown) is required to separate input signal 51 and output signal 52.

Figure 1B:
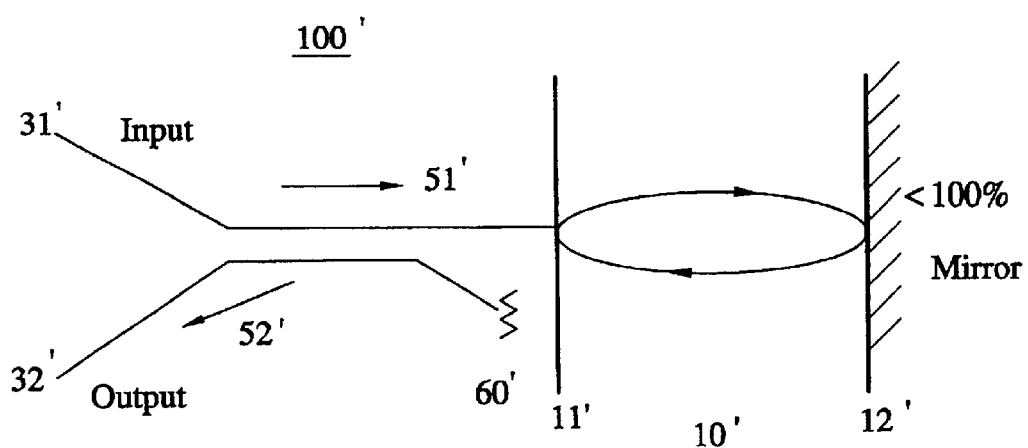
FIG. 1b is a schematic illustration of a two-port Fabry-Perot etalon based optical dispersion compensator in the prior art.

FIG. 1b is a schematic illustration of a similar two-port Fabry-Perot etalon based optical dispersion compensator 100' in the prior art. The Fabry-Perot etalon 10' has a front partially reflective mirror 11' spaced apart in a parallel relationship with a rear reflective mirror 12'. An input optical signal 51' is coupled into an input fiber 31' and the reflected output signal 52' after going through the Fabry-Perot etalon 10' is transmitted outward through an output fiber 32'. The difference between this design and design of FIG. 1a is that the reflectivity of the rear reflective mirror 12' is not exact 100%. It is a little bit lower than 100% for the output port monitoring (not shown). A piezo-electric transducer (not shown) is used to dynamically control the optical path length of the Fabry-Perot etalon 10'. However, as it is still a normal reflective device, a 3 dB coupler 60' or an optical circulator (not shown) is required to separate input signal 51' and output signal 52'. Generally, a 3 dB coupler will results in a 6 dB round-trip loss and an optical circulator will result in about a 3 dB loss.

Figure 2:
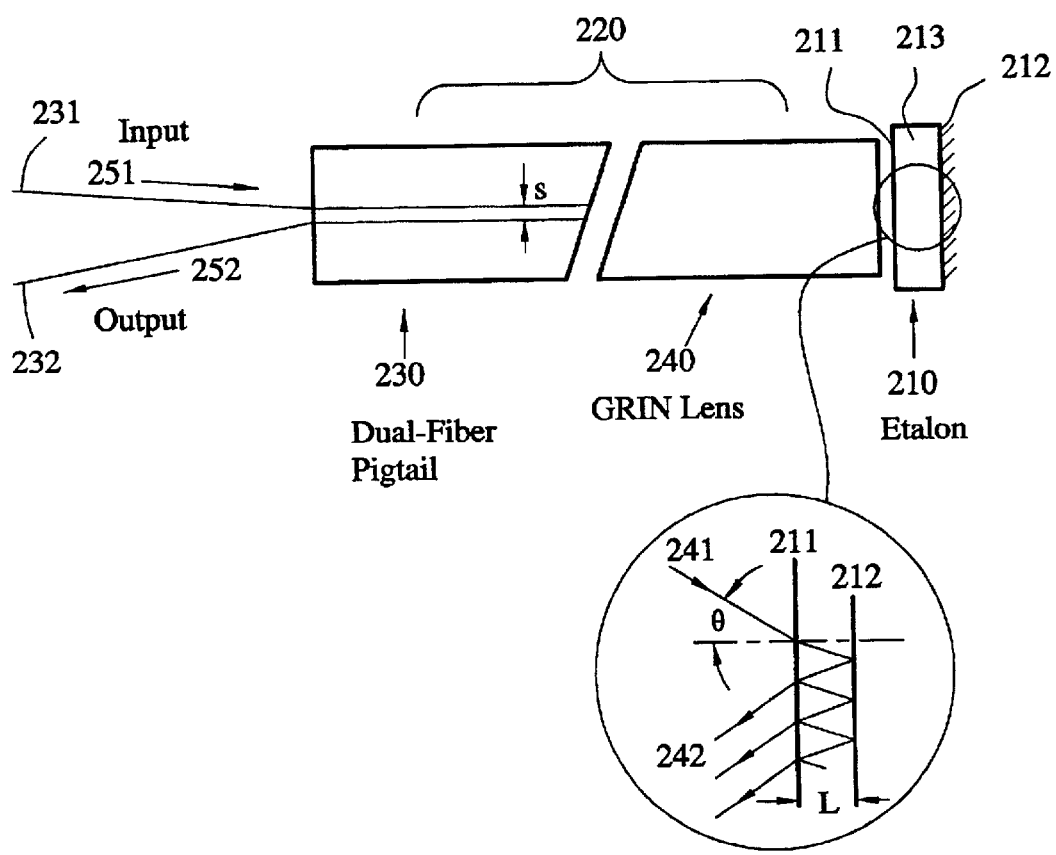
FIG. 2 is a schematic illustration of the miniature optical dispersion compensator of the present invention.

FIG. 2 shows an exemplary embodiment of a miniature optical dispersion compensator 200 of the present invention. The optical dispersion compensator 200 has a dual-fiber collimator 220 having a pigtail 230 with an input fiber 231 and an output fiber 232 and a GRIN lens 240, and a Fabry-Perot etalon 210 having a front reflective mirror 211 and a rear reflective mirror 212 to form a cavity 213. An input optical signal 251 is coupled into the input fiber 231. The light beam after passing through the dual-fiber pigtail 230 is collimated by the GRIN lens 240 into a collimated incident beam 241 which is incident on the Fabry-Berot etalon 210. The front side of the Fabry-Perot etalon 210 is coated into the front reflective mirror 211 with low reflectivity, and the rear side of Fabry-Perot etalon 210 is coated into the rear reflective mirror 212 with high reflectivity, which is substantially 100%, or between 97% and 100%. The reflectivity of the front reflective mirror 211 is substantially smaller than that of the rear reflective mirror 212. The collimated incident beam 241 will reflect many times inside the etalon cavity 213. As the collimated incident bean 241 is not normal to the etalon mirror surface, not all of the reflected light beam 242 will couple into the output fiber 232 of the dual-fiber pigtail 230. Instead of achieving the dispersion compensation by tuning the cavity length L as in the prior arts, the compensator 200 of the present invention tunes the incident angle θ of the collimated incident beam 241 by adjusting the separation S (see also FIG. 3) between the fibers 231 and 232 inside the dual-fiber pigtail 230. Such an optical dispersion compensator 200 has at least one negative dispersion region in its output response.

Figure 3A:
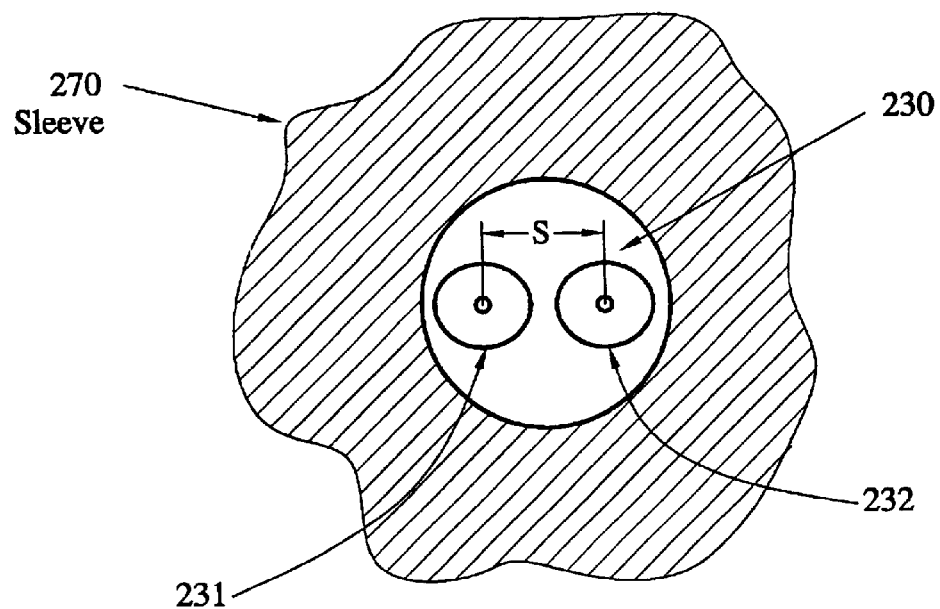
FIG. 3a is a schematic illustration of the arrangement of the two optical fibers of a dual-fiber pigtail inside a sleeve.
Figure 3B:
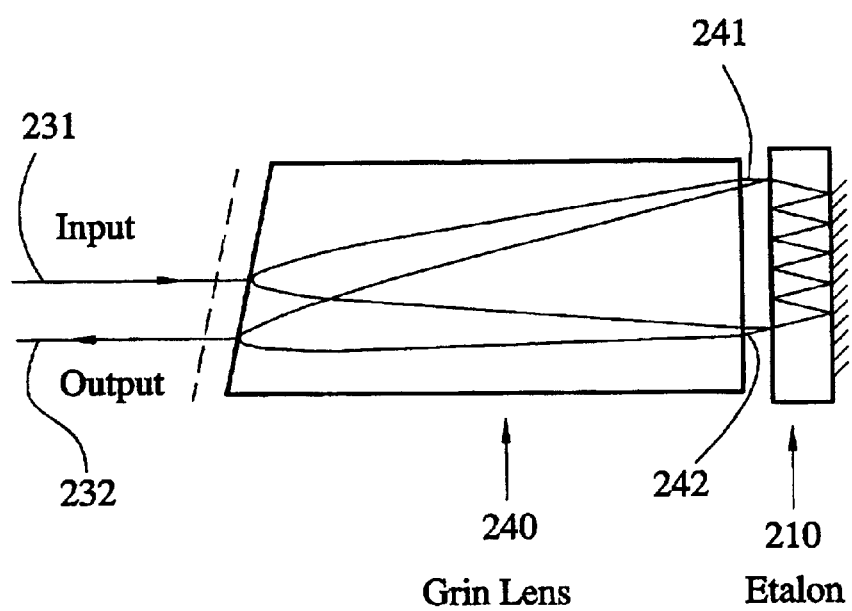
FIG. 3b is a schematic view illustrating the optical signal coupling back into the output fiber after going through the etalon.

FIG. 3a shows the arrangement of the two optical fibers 231 and 232 of the dual-fiber pigtail 230 within an aperture of the sleeve 270 of the optical dispersion compensator of the present invention. By adjusting the center-to-center separation S between the two fibers, the two collimated light beams 241, 242 (see also FIG. 4) after the GRIN lens 240 will change the incident angle θ and the related reflected angle. By tuning this angle θ, the group delay pattern of the output optical signal will shift along with wavelength, and the middle wavelength of the predetermined range of wavelengths can be located in the downturn slope range of the group delay pattern, or in other words, in the negative dispersion region of the compensator. The middle wavelength of the predetermined range of wavelengths can be any ITU wavelength corresponding to an ITU channel or other operating wavelengths in the art. The predetermined range can be ITU 100 GHz free spectral range (FSR) or other operating ranges in the art. FIG. 3b shows that the collimated incident beam 241 from the input fiber 231 is reflected back as a collimated reflected beam 242 which is coupled into the output fiber 232 after going through the etalon 210.

Figure 4:
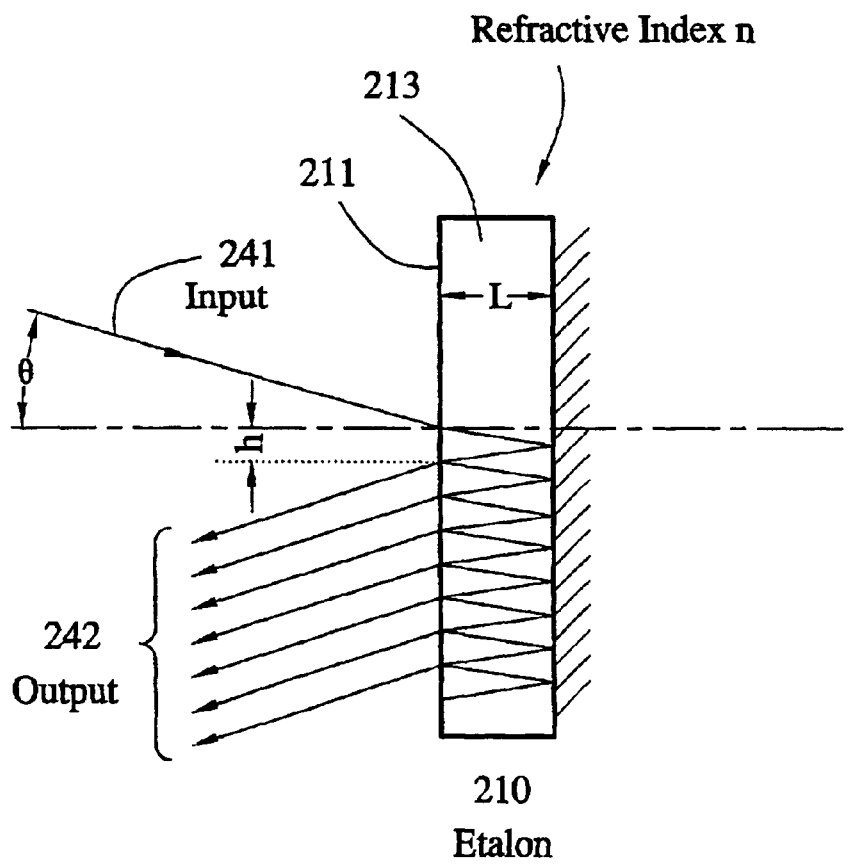
FIG. 4 is a schematic view illustrating the reflected mechanism of the optical signal inside and the etalon.

FIG. 4 shows one of the main differences between the compensator of the present invention and those in the prior arts. Instead of using normal incidence, the collimated incident beam 241 of the present invention is incident onto the etalon 210 by an incident angle θ. If the light is incident onto the etalon 210 normally, the reflected light is the result of interference of unlimited reflected times of the input signal inside the etalon cavity 213. So, there is no insertion loss ripple for the entire operating wavelength range. But if the collimated incident beam 241 has a certain incident angle θ to the front reflective mirror 211, only limited reflected light 242 will couple back into the output fiber 232 (see also FIG. 2). After certain times of reflection, the reflected light is out of the range of the dual-fiber collimator 220 (see also FIG. 2), the rest part of the light cannot couple back into the dual-fiber collimator 220, that is why the insertion loss ripple has been observed based on the present invention. In FIG. 4, the walk-off distance, the cavity length and the refractive index of the etalon medium are indicated by h, L, and n respectively.

Figure 5:
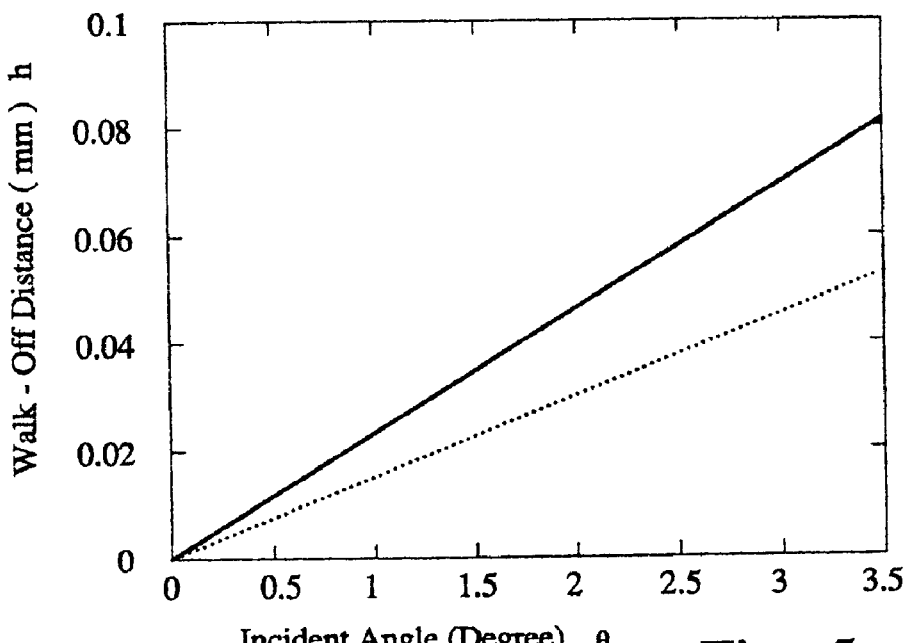
FIG. 5 is a graph of the walk-off distance versus incident angle.

FIG. 5 shows the simulation results of the walk-off distance h versus the incident angle θ. For easy comparison, the length of the cavity is chosen to be the length for a free spectral range (FSR) of 100 GHZ. For solid line, the refractive index of the etalon medium n is 1.5, the cavity length L is 1 mm, and for the dashed line, the refractive index of the etalon medium n is 1.85, and the cavity length L is 0.81 mm.

Figure 6:
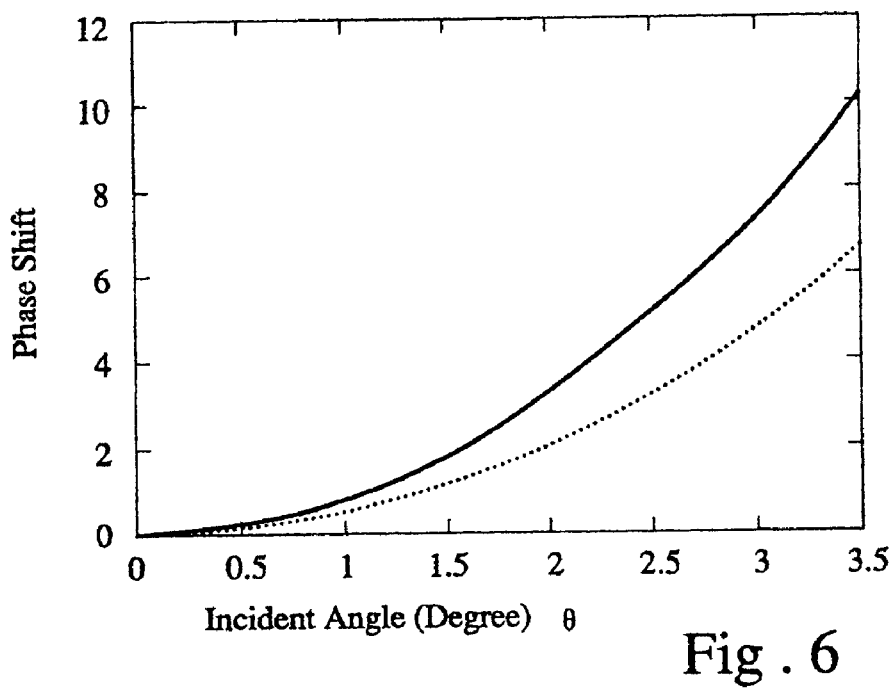
FIG. 6 is a graph of phase shift versus incident angle.

FIG. 6 shows the tuning capability of the optical dispersion compensator of the present invention. By tuning the incident angle θ, the phase shift can be adjusted, thus the middle wavelength of the predetermined range of wavelengths or a certain ITU wavelength can be located, and dispersion compensation can be achieved. The solid line and dashed line have the same parameters as those in FIG. 5. For same incident angle θ, the etalon with smaller refractive index has higher phase shift tunable capability.

Figure 7:
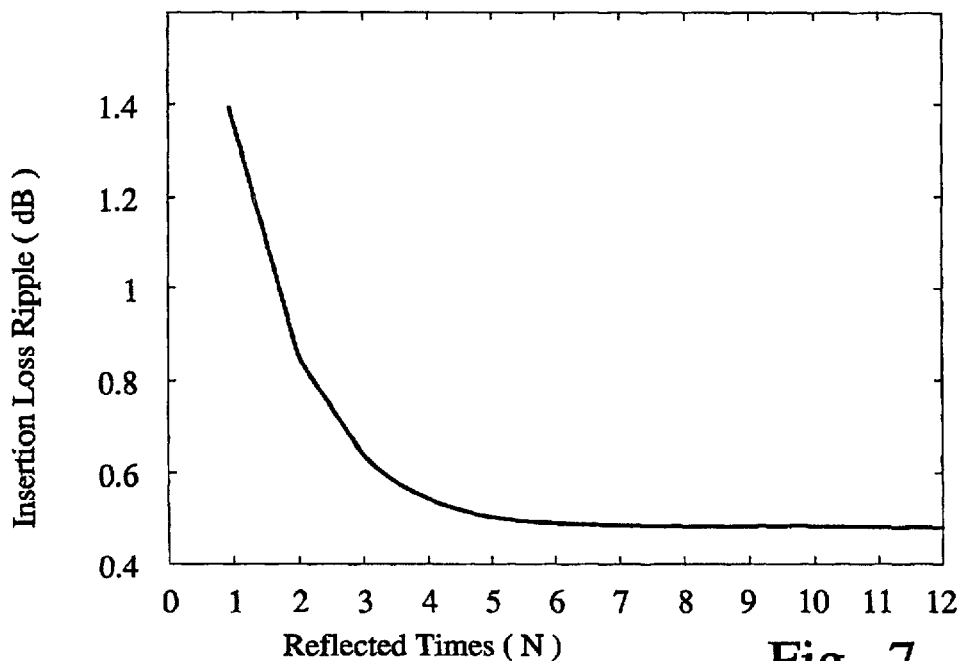
FIG. 7 is a graph of insertion loss versus reflected times of the collected light based on the optical dispersion compensator of the present invention.

As shown in FIGS. 5 and 6, the incident angle θ is about 2 degree for the solid line case if the phase shift is π. If the incident angle θ is around 2 degree, the walk-off distance h is about 0.045 mm. For regular 1.8 mm GRIN lens, the diameter of the collimated incident beam is about 500 μm and then less than 10 times of reflection could be collected by the GRIN lens. FIG. 7 shows the variation of the insertion loss versus the reflected times of the collected light based on the optical dispersion compensator of the present invention. Even one time, the insertion loss is only 1.4 dB, and if higher than 5 times, the insertion loss can be lower than 0.3 dB. In FIG. 7, the reflectivity of the front reflective mirror of the etalon is 50%, the reflectivity of the rear reflective mirror of the etalon is substantially 100%, refractive index of the etalon medium is 1.5, the cavity length is 1 mm, and the incident angle θ under this situation is chosen to be at maximum 3.5 degree. Generally, under different situations, the incident angle θ can be chosen within a range between 0 degree and 5 degree to assure the collection of sufficient reflected light.

Although the insertion loss of the present invention is low, the insertion loss ripple from the reflected optical signal needs to be compressed. To depress this ripple, more reflected light needs to be collected. It is not practical to infinitely reduce the incident angle which will causes similar problems in the prior arts as discussed above. To realize a simple and efficient design, larger size GRIN lens is used in the optical dispersion compensator of the present invention, the diameter of the GRIN lens can be 4 mm, such as SLW-400-025-156-A2-80 from NSG America, Inc. of New Jersey, U.S.A, or even larger. So the diameter of the collimated incident beam coming out of this kind of GRIN lens will be about 1 mm which is two times as large as that of a regular 1.8 mm GRIN lens. Once the effective area of the GRIN lens is increased, the more reflected light can be collected, thus the ripple can be depressed to an affordable value. Table I shows insertion loss ripple versus reflected times at different reflectivity of the front reflective mirror of the etalon.

TABLE I

| N | ILR (db) | $r_f$ (%) 10 | 20 | 30 | 40 | 50 |
|---|---|---|---|---|---|---|
| 8 | | 0.014 | 0.047 | 0.21 | 0.64 | 1.53 |
| 9 | | 0.013 | 0.032 | 0.17 | 0.42 | 1.10 |
| 10 | | 0.0125 | 0.025 | 0.053 | 0.27 | 0.81 |
| 11 | | 0.0125 | 0.022 | 0.049 | 0.18 | 0.58 |

TABLE I-continued

| N | ILR (db) | $r_f$ (%) 10 | 20 | 30 | 40 | 50 |
|---|---|---|---|---|---|---|
| 12 | | 0.0125 | 0.025 | 0.039 | 0.12 | 0.42 |
| 13 | | 0.0125 | 0.02 | 0.034 | 0.08 | 0.30 |
| 14 | | 0.0125 | 0.02 | 0.031 | 0.065 | 0.22 |
| 15 | | 0.0125 | 0.02 | 0.030 | 0.054 | 0.16 |
| 16 | | 0.0125 | 0.02 | 0.029 | 0.048 | 0.12 |
| 17 | | 0.0125 | 0.02 | 0.029 | 0.043 | 0.10 |
| 18 | | 0.0125 | 0.02 | 0.028 | 0.041 | 0.08 |
| 19 | | 0.0125 | 0.02 | 0.028 | 0.039 | 0.07 |
| 20 | | 0.0125 | 0.02 | 0.028 | 0.038 | 0.06 |
| ∞ | | 0.0125 | 0.02 | 0.028 | 0.037 | 0.05 |

Wherein $r_f$ is the reflectivity of the front reflective mirror, ILR is the insertion loss ripple and N is the reflected times. The reflectivity of the rear reflective mirror is 99.8%.

One important thing is that after the insertion loss ripple is compressed, the group delay is still meeting the design requirements. Table II shows group delay peak versus the variation of the reflected times with different reflectivity of the front reflective mirror.

TABLE II

| N | GD (ps) | $r_f$ (%) 10 | 20 | 30 | 40 | 50 |
|---|---|---|---|---|---|---|
| 8 | 14 | 22.4 | 30.9 | 40.3 | 51.7 | |
| 9 | 14 | 22.4 | 31.1 | 40.9 | 52.6 | |
| 10 | 14 | 22.4 | 31.2 | 41.3 | 53.4 | |
| 11 | 14 | 22.4 | 31.2 | 41.6 | 54.2 | |
| 12 | 14 | 22.4 | 31.3 | 41.9 | 54.7 | |
| 13 | 14 | 22.4 | 31.3 | 42.0 | 55.2 | |
| 14 | 14 | 22.4 | 31.3 | 42.1 | 55.5 | |
| 15 | 14 | 22.4 | 31.3 | 42.1 | 56.0 | |
| 16 | 14 | 22.4 | 31.3 | 42.1 | 56.2 | |
| 17 | 14 | 22.4 | 31.4 | 42.2 | 56.3 | |
| 18 | 14 | 22.4 | 31.5 | 42.4 | 56.3 | |
| 19 | 14 | 22.4 | 31.5 | 42.4 | 56.3 | |
| 20 | 14 | 22.4 | 31.5 | 42.4 | 56.6 | |
| ∞ | 14 | 22.4 | 31.5 | 42.4 | 57.0 | |

Wherein $r_f$ is the front mirror reflectivity for the etalon, GD is the group delay peak and N is the reflected times. The reflectivity of the rear reflective mirror is 99.8%.

For the above two tables, the highest intensity reflectivity of the front reflective mirror is chosen to be 50%, as the bandwidth will be very narrow if higher front mirror reflectivity is used. Generally, the reflectivity of the front reflective mirror is chosen to be not greater than 60%. Based on different requirements, the reflectivity of the front mirror can be chosen preferably in the range of not greater than 40%. The insertion loss ripple can be easily compressed to lower than 0.5 dB. Generally, the reflectivity of the rear reflective mirror can be selected in a range of 97% to 100%.

By attaching a piece of an etalon at the end of the GRIN lens, the optical dispersion compensator of the present invention has the following advantages:

a) Small and compact in size by using just a dual-fiber pigtail, a GRIN lens, and a etalon;

a) Low insertion loss and low insertion loss ripple by eliminating the use of 3 dB coupler or optical circulator;

a) Low cost and suitable for mass production;

a) Broadband comparing to etalon technology based prior arts; and a) As the insertion loss is so small, several compensators can be cascaded to expand the bandwidth and dispersion.

The etalon of the present invention can be any form of etalon structures which are familiar to those skilled in the art. According to one embodiment of tne present invention, the etalon can be a solid substrate coated with reflective films on its parallel-spaced two side surfaces. One disadvantage of this approach is that the etalon is based on a solid substrate, the temperature effect will be a challenge for a temperature variable environment.

Figure 8:
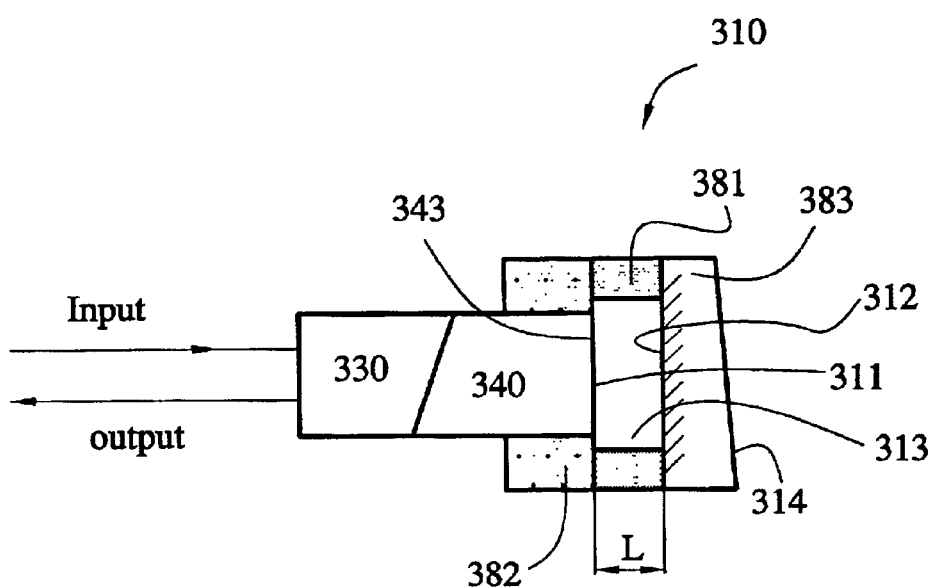
FIG. 8 is a schematic illustration of a temperature stable dispersion compensator by using the end surface of the GRIN lens as the front reflective mirror of the etalon.

FIG. 8 shows an alternative design of the present invention which is more temperature stable. Instead of attaching an etalon substrate directly to the GRIN lens 340's end, the GRIN lens end surface 343 is used as the front reflective mirror 311 of the cavity 313 of the etalon 310, and the rear reflective mirror 312 is a coated mirror on the substrate 383. The cavity 313 is now filled by air, and the cavity length L is assured by a spacer 381, which is made of highly temperature stable material, such as Zerodur glass. Its temperature coefficient is around $3 \times 10^{-8}$, by sealing the optical dispersion compensator 300, the refractive index of the air inside the cavity does not change with the variation of the environmental temperatures. Therefore this design is suitable for rough temperature conditions.

As shown in FIG. 8, the temperature stable optical dispersion compensator 300 has a GRIN lens 340 with a dual-fiber pigtail 330, a glass tub 382 with same temperature coefficient to the GRIN lens 340, a spacer 381 made of Zerodur glass, a substrate 383 with a small angle between a rear reflective mirror 312 and the other surface 314. This polished angle β of the substrate 383 can eliminate the Fabry-Perot cavity effect from the substrate 383. The end surface 343 of the GRIN lens 340 is coated with partial reflective film as the front reflective mirror 311 of the etalon 310. The rear reflective mirror 312 of the substrate surface 383 is coated with a film having a reflectivity of substantially 100%. By sealing the substrate 383, the spacer 381, the GRIN lens 340, and the glass tube 382, the whole optical dispersion compensator 300 is temperature stabilized.

For compensating the dispersion of optical fibers, a substantially linear group delay response, or in other words a substantially linear negative dispersion region is needed across the channel pass-band. A single-stage optical dispersion compensator has a limited bandwidth over which a linear response can be approximated. The bandwidth decreases as the dispersion increases, and vice versa.

By changing the reflectivity of the less reflective mirror (the front reflective mirror) from a higher to lower reflectivity, the optical dispersion compensator's delay and bandwidth response undesirably move apart. Unfortunately, as the delay response increases, the frequency range over which the compensator operates decreases. Cascading two optical dispersion compensators having the same reflectivity on the front reflective mirrors has been suggested, but this does not produce optimum results with respect to increasing the wavelength region over which the compensator operates. However, it has been found that by cascading two etalons with different reflectivity for the two front reflective mirrors, it is possible to extend the range of the output response considerably, with respect to both time delay and operating wavelengths.

Figure 17:
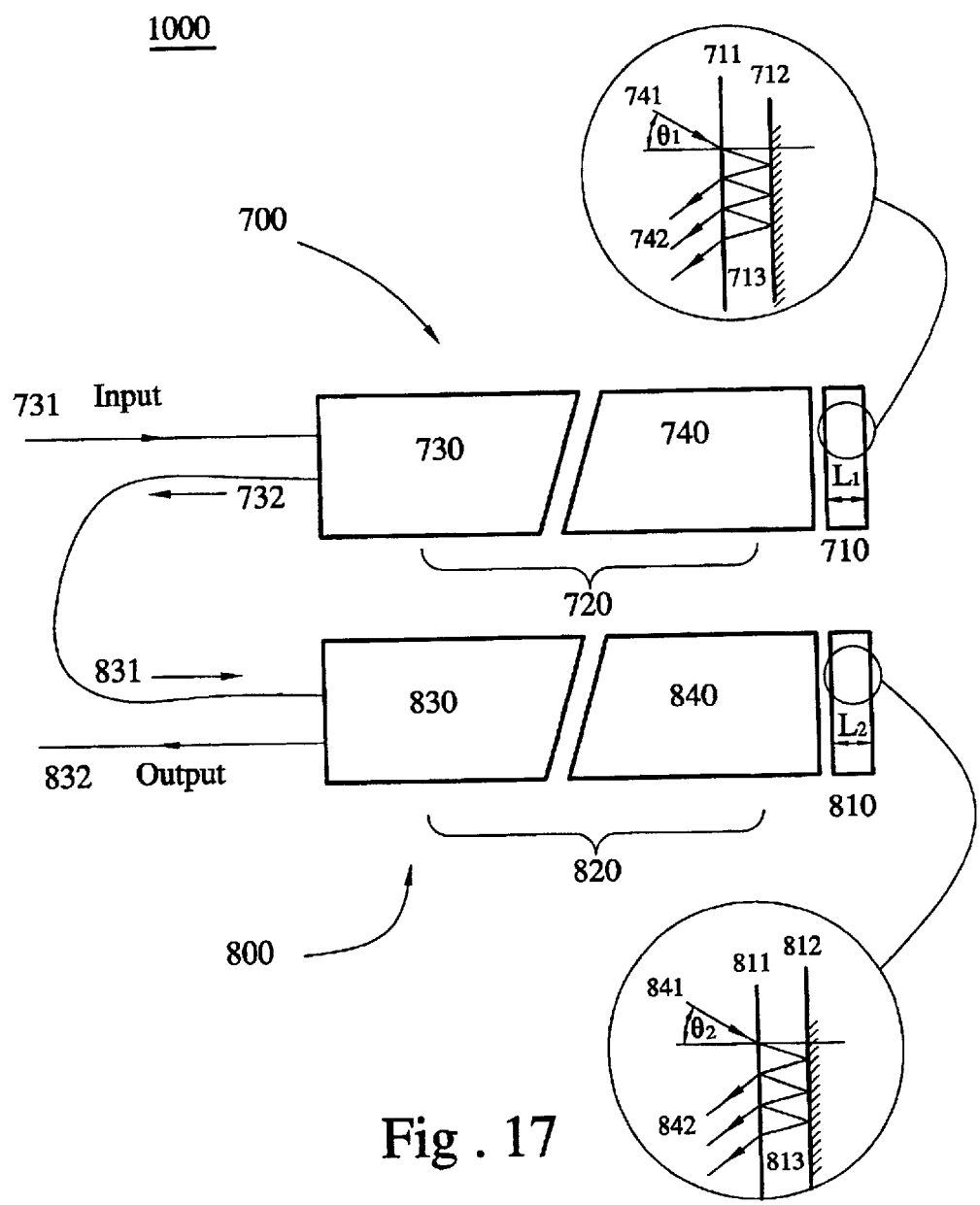
FIG. 17 is a schematic illustration of an optical dispersion compensation system of the present invention comprising two cascaded dispersion compensators.

According to another embodiment of the present invention, a two-stage optical dispersion compensation system for a predetermined range of wavelengths comprising two optical dispersion compensators of the present invention is provided as shown in FIG. 17. The optical dispersion compensation system 1000 has a first optical dispersion compensator 700 and a second optical dispersion compensator 800. The first optical dispersion compensator 700 has a first Fabry-Perot etalon 710, a first dual-fiber collimator 720 comprising a first dual-fiber pigtail 730 and a first GRIN lens 740. The first Fabry-Perot etalon 710 has a first front reflective mirror 711 and a first rear reflective mirror 712 in a parallel spaced relationship to form a first cavity 713 with a first length $L_1$ between the first front reflective mirror 711 and the first rear reflective mirror 712. The reflectivity of the first front reflective mirror 711 is substantially smaller than the reflectivity of the first rear reflective mirror 712, the reflectivity of the first rear reflective mirror 712 is substantially 100%, or between 97% and 100%. The first dual-fiber pigtail 730 has a first input fiber 731 and a first output fiber 732. The second optical dispersion compensator 800 has a second Fabry-Perot etalon 810, a second dual-fiber collimator 820 comprising a second dual-fiber pigtail 830 and a second GRIN lens 840. The second Fabry-Perot etalon 810 has a second front reflective mirror 211 and a second rear reflective mirror 812 in a parallel spaced relationship to form a second cavity 813 with a second length $L_2$ between the second front reflective mirror 811 and the second rear reflective mirror 812. The reflectivity of the second front reflective mirror 811 is substantially smaller than the reflectivity of the second rear reflective mirror 812, the reflectivity of the second rear reflective mirror 812 is substantially 100%, or between 97% and 100%. The second dual-fiber pigtail 830 has a second input fiber 831 and a second output fiber 832.

An optical signal is coupled into the first input fiber 731 and then collimated by the first GRIN lens 740 into a first collimated incident beam 741 which is incident on the first Fabry-Perot etalon 710 with a first incident angle $\theta_1$, the first collimated incident beam 741 is reflected back by the first Fabry-Perot etalon 710 into a first collimated reflected beam 742 which is collected by the first GRIN lens 740 and then coupled. into the first output fiber 732, the optical signal from the first output fiber 732 is further coupled into the second input fiber 831 and then collimated by the second GRIN lens 840 into a second collimated incident beam 841 which is incident on the second Fabry-Perot etalon 810 with a second incident angle $\theta_2$, the second collimated incident beam 841 is reflected back by the second Fabry-Perot etalon 810 into a second collimated reflected beam 842 which is collected by the second GRIN lens 840 and then coupled into the second output fiber 832. At least one negative dispersion region can be obtained in the output response of the optical dispersion compensation system.

The first output fiber 732 and the second input fiber 831 can be a same fiber. The reflectivity of the first front reflective mirror 711 can be different from that of the second front reflective mirror 811. The first incident angle $\theta_1$ can be different from the second incident angle $\theta_2$. Also, the first cavity length $L_1$ can be different from the second cavity length $L_2$. Generally, the optical parameters of the first optical dispersion compensator 700 can be same as or different from those of the second optical dispersion compensator 800 for different purposes.

As the most important advantage of optical dispersion compensator of the present invention is lower insertion loss, it is possible to cascade not only two but also three or more compensators of the present invention with different optical parameters to expand the bandwidth and the negative dispersion region for compensation.

The group delay for a N-stage, lossless all-pass filter is $$\tau(\lambda) = T\Sigma(1-r_N^2)[1+r_N^2-2r_N\cos(4\pi nL/\lambda-\Phi_N)] \quad (1)$$

Wherein $r_N$ and $\Phi_N=(2\pi/\lambda)\Delta_N$ are the reflectivity of the front reflective mirror and phase shift of the Nth-stage, respectively. $\Delta_N$ equals to $2n(L-L_N)$ for the prior cavity length adjusting devices. For the optical dispersion compensator of the present invention, incident angle will be adjusted and $\Delta_N$ equals to $2\,nL(1-\cos\theta_N)$. L is the normalized cavity length, $L_N$ is the length of Nth stage cavity, and $\theta_N$ is Nth stage tuning angle. T equals to $1/FSR=2n\,L/C$, n is the refractive index of the etalon medium, $\lambda$ is the wavelength and C is the light speed in the air.

Figure 9:
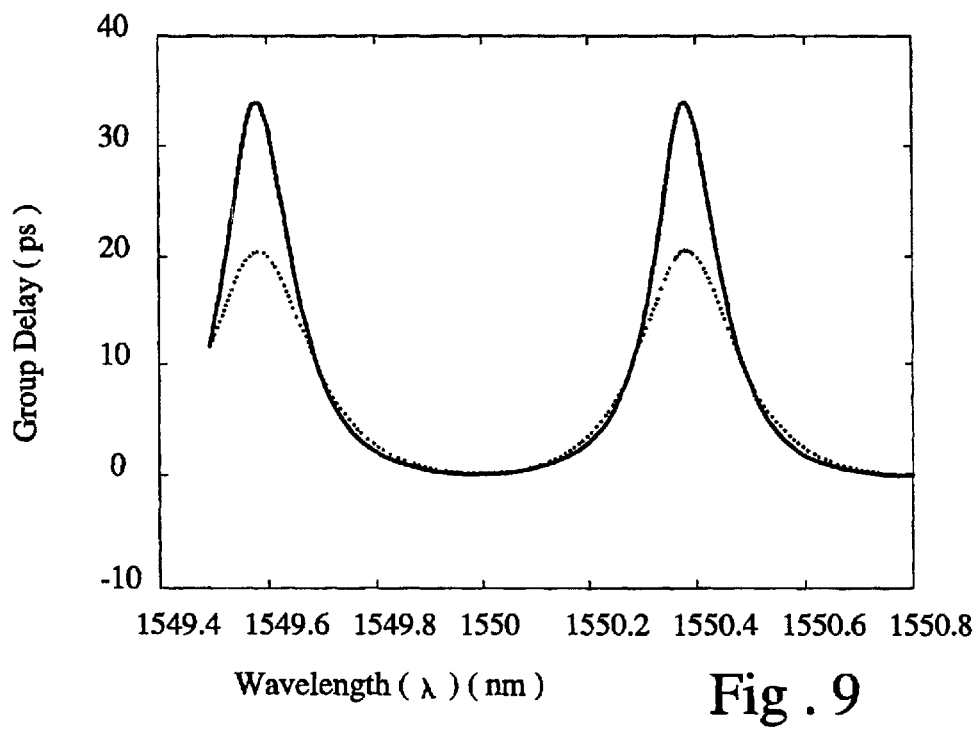
FIG. 9 is a graph of group delay versus wavelength for two compensators with normal incident angles, wherein n=1.5, L=1 mm, and FSR=100 GHz.
Figure 10:
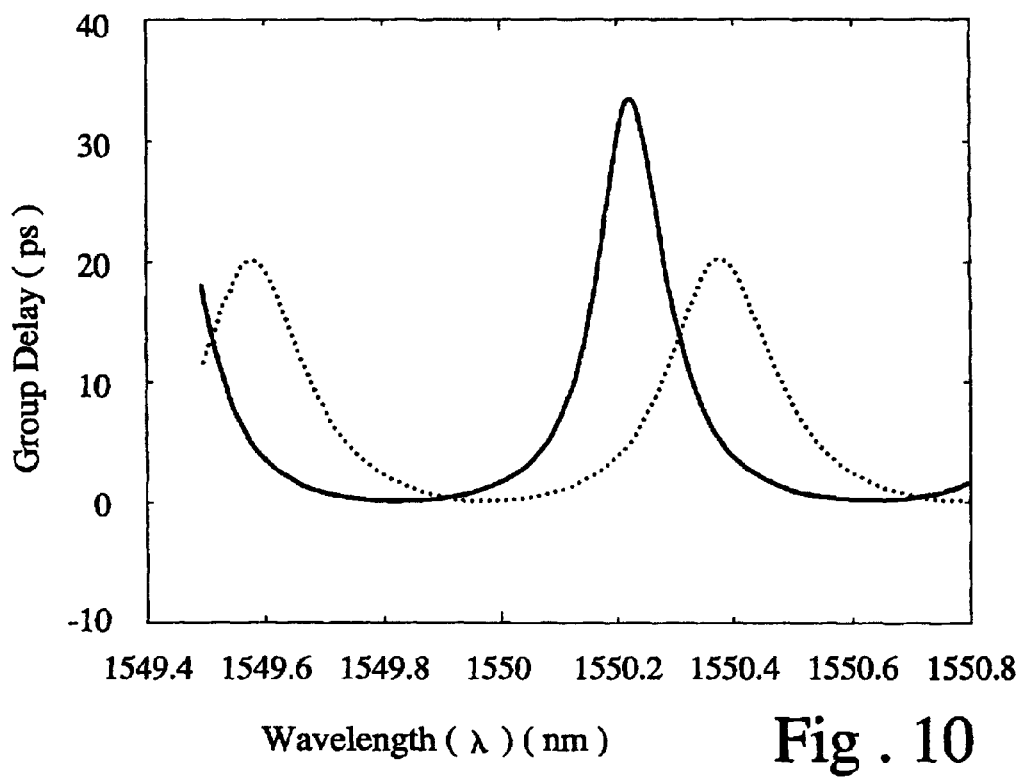
FIG. 10 is a graph of group delay of two compensators with different phase shifts, wherein n=1.5, L=1 mm, and FSR=100 GHz.

According to another embodiment of the present invention for 100 GHz FSR, a two-stage optical dispersion system comprising a first optical dispersion compensator and a second optical dispersion compensator is provided with a reflectivity of 57% for the first front reflective mirror and a reflectivity of 42% for the second front reflective mirror. If the incident angle is zero (normal incidence), the two compensator's results of the group delay versus wavelength are shown in FIG. 9, wherein the solid line is indicating the first compensator and the dash line is indicating the second compensator. From this figure, it can be found that the bandwidth of the substantially linear negative dispersion region is only about 10 GHz. Instead of normal incidence, if the phase shift of the first compensator is set at 1.18 by tuning the incident angle and the phase shift of the second compensator at 0, the peak group delay of the first compensator will move about 0.15 nm, as shown in FIG. 10.

Figure 11:
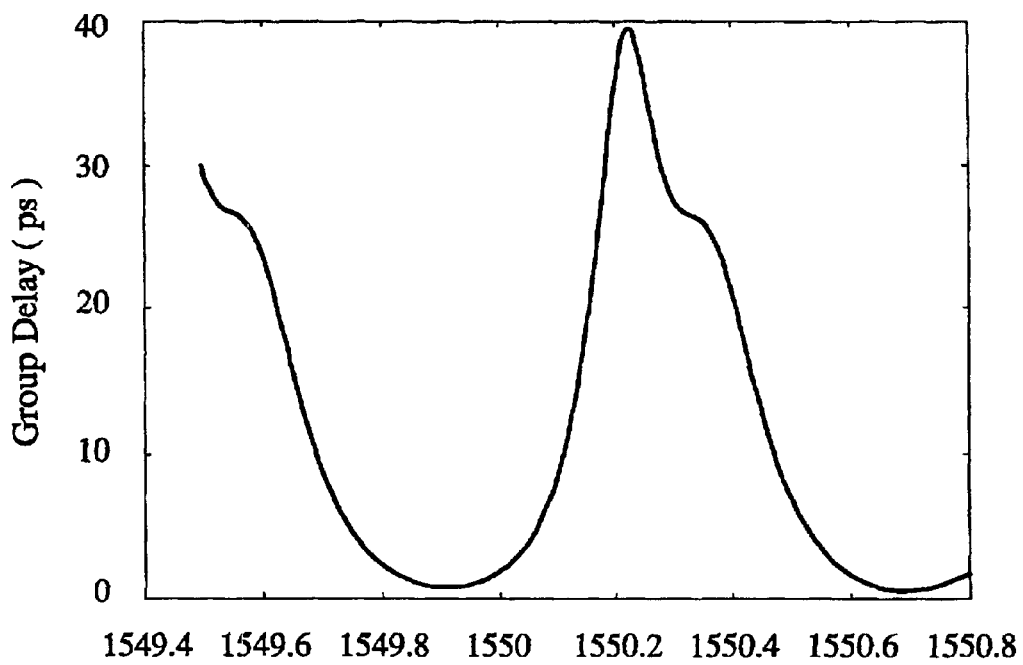
FIG. 11 is a graph of group delay changes by cascading two dispersion compensators with phase shift difference of 1.18 between the two compensators.

FIG. 11 shows the result by cascading the two optical dispersion compensators of the present invention with phase shift difference of 1.18 between two compensators.

Figure 12:
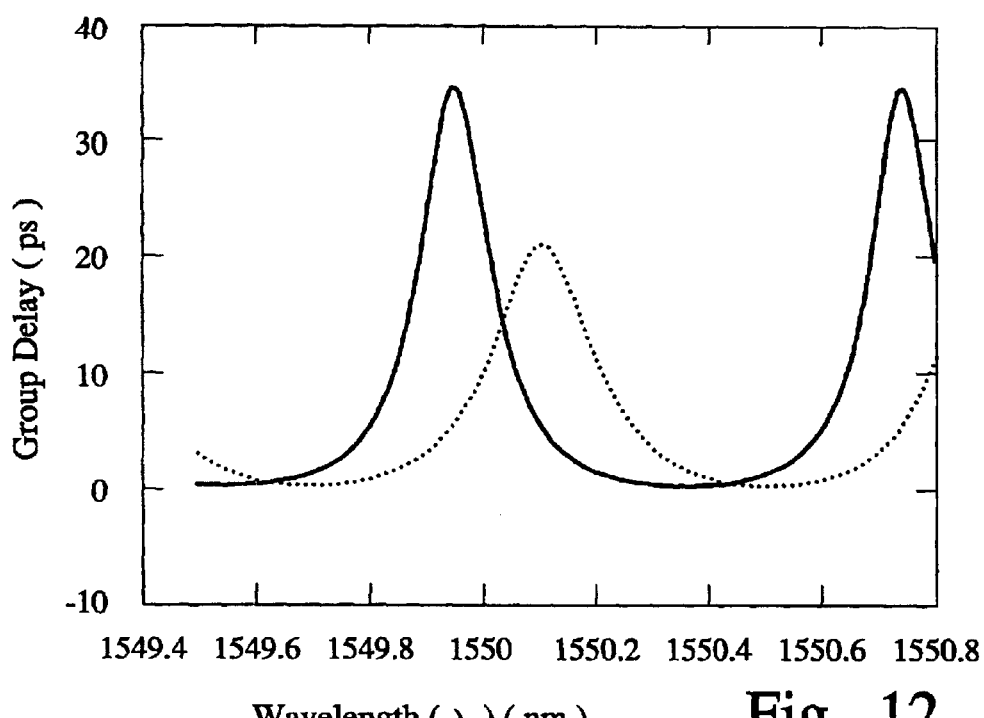
FIG. 12 is a graph of two dispersion compensators' group delay variation with phase shifts of 3.48 and 2.3 to meet the ITU wavelength locating requirements.

Referring to FIG. 11, the bandwidth of the substantially linear negative dispersion region is about 50 GHz and the dispersion is about −100 ps/nm. Certain group delay ripple can be seen, which can be decreased substantially by cascading three optical dispersion compensators of the present invention. It can also be seen that linear negative dispersion region's middle wavelength 1550.42 nm is not located at the ITU wavelength 1550.12 nm (ITU channel 34). There is a difference of 0.3 nm. So, to meet this requirement, phase shifts of the two cascaded compensators need to be changed at the same time. For example, if the linear negative region's middle wavelength should be located at the ITU wavelength 1550.12 nm (ITU channel 34), both curves in FIG. 10 need to be shifted 0.3 nm toward shorter wavelength. For 100 GHz FSR, this equals phase shift $(0.3/0.8)2\pi=2.3$. Thus the phase shifts of the first and second compensators can be $\Phi_1=1.18+2.3=3.48$ and $\Phi_2=2.3$. FIG. 12 shows the group delay versus wavelength changes for the two compensators under the above parameters. The solid line indicates the first compensator and the dash line indicates the second compensator.

Figure 13:
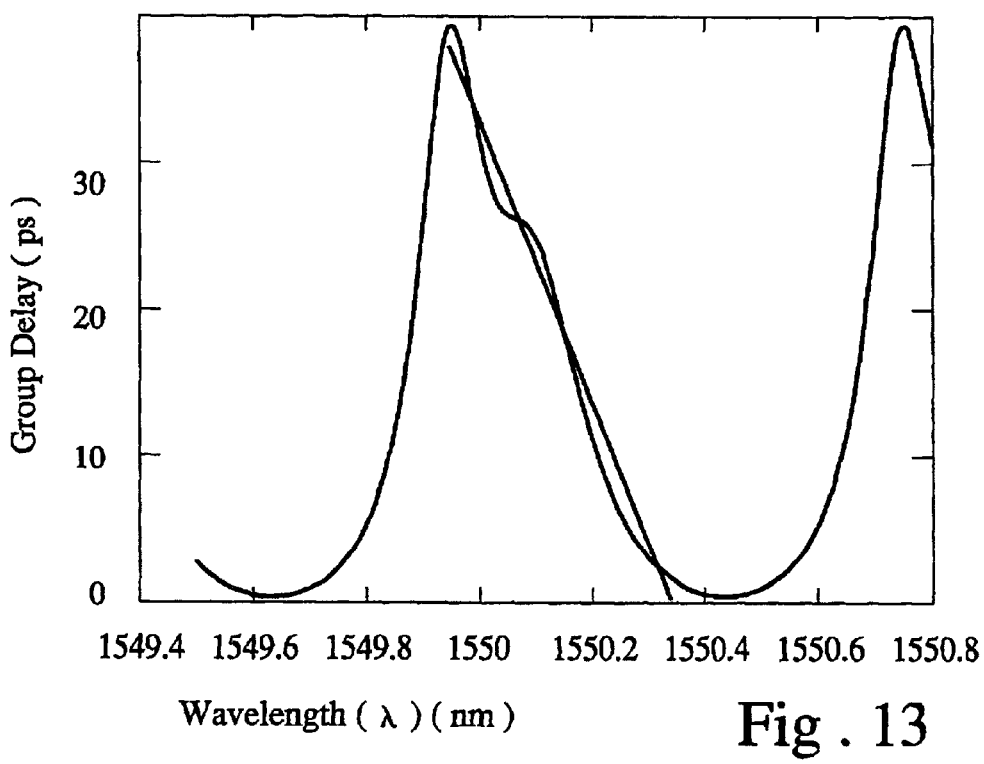
FIG. 13 is a graph of cascading result for two selected dispersion compensators to meet the 100 GHz ITU requirements.

FIG. 13 shows the cascading result of the above two optical dispersion compensators. It can be seen that a substantially linear negative region is achieved with its middle wavelength being just located at the 1550.12 nm (ITU channel 34) position of the ITU 100 GHz FSR. Similarly, other channels can be matched by the present invention which is apparent to those skilled in the art.

According to yet another embodiment of the present invention, a method of fabricating an optical dispersion compensator for a predetermined range of wavelengths is provided to produce at least one negative dispersion region in the output response of the compensator. The method comprises coating the front surface and the rear surface of a etalon into a front reflective mirror and a rear reflective mirror, fixating a GRIN lens with the etalon, choosing a dual-fiber pigtail having an input fiber and an output fiber with a separation between the input fiber and the output fiber, aligning the dual-fiber pigtail with the GRIN lens fixated with the etalon to reach a predetermined low insertion loss, and fixating the dual-fiber pigtail with the GRIN lens fixated with the etalon. The reflectivity of the front reflective mirror is substantially smaller than the reflectivity of the rear reflective mirror, the reflectivity of the rear reflective mirror is substantially 100%, or between 97% and 100%.

The step of choosing a dual-fiber pigtail further comprises adjusting the separation between the input fiber and output fiber, such that the phase shift of the optical dispersion compensator can be adjusted and the middle wavelength of the predetermined range of wavelengths can be located substantially in the middle of the negative dispersion region.

The method can further comprise machining the etalon into an adaptable size to the diameter of the GRIN lens. For an example, an etalon substrate can be machined into a dimension of $2.8\times2.8\times1$ mm$^3$ for a 4 mm GRIN lens. The step of fixating the GRIN lens with the etalon can comprise applying an adhesive, e.g. UV glue or epoxy glue (e.g. 353 NDTQ). The step of fixating the dual-fiber pigtail with the GRIN lens fixated with the etalon can also comprises applying an adhesive, e.g. UV glue or epoxy glue (e.g. 353 NDTQ). The step of aligning the dual-fiber pigtail with the GRIN lens fixated with the etalon can comprises coupling an light source into the input fiber and coupling the optical signal from the output fiber into a optical spectral analyzer.

Figure 14:
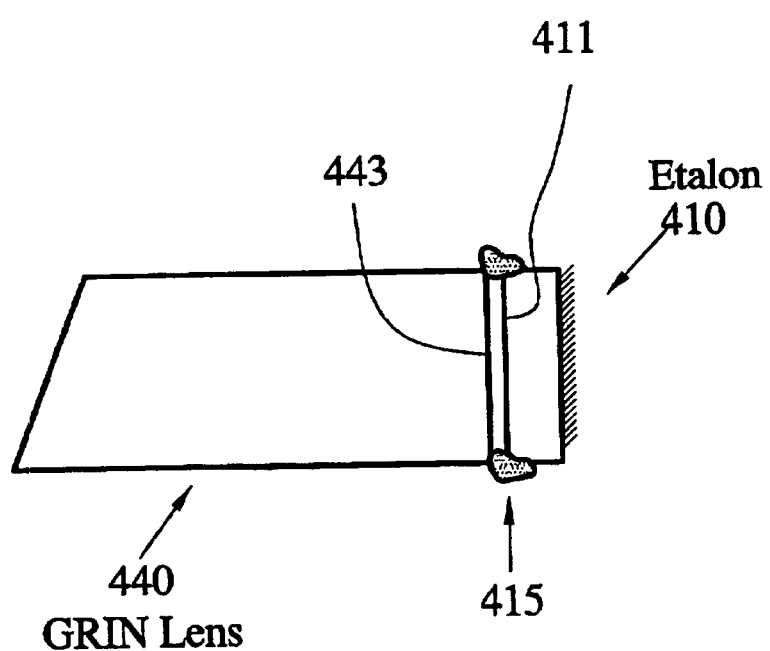
FIG. 14 is a schematic view illustrating gluing the GRIN lens and the etalon together.

FIG. 14 is a schematic illustration of fixating the GRIN lens 440 to the etalon 410 by glue 415. The etalon's front reflective mirror 411 is fixated to the end surface 441 of the GRIN lens 440 by using UV glue or epoxy glue 415 (e.g. 353 NDTQ).

Figure 15:
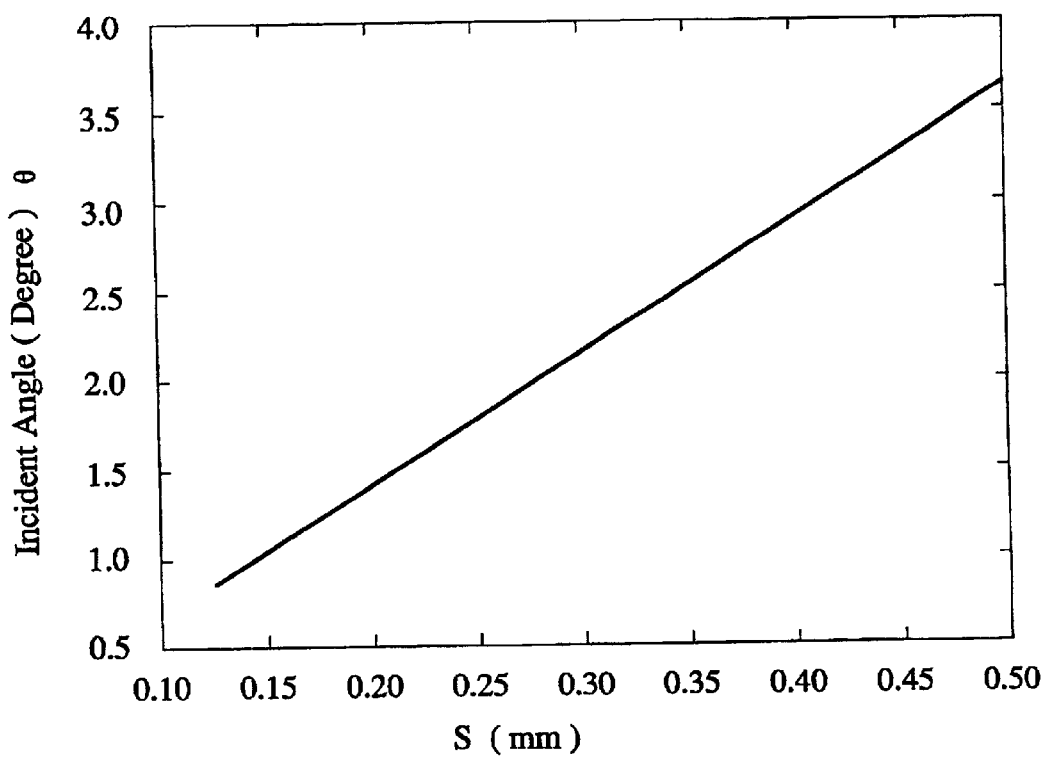
FIG. 15 is a graph of incident angle versus center-to-center separation S of the two fibers in the dual-fiber pigtail for GRIN lens with a diameter of 4 mm.

When choosing the suitable dual-fiber pigtail, the incident angle can be obtained on the basis of the predetermined phase shift value from FIG. 6. Once the incident angle is obtained, the dual-fiber pigtail number can be decided from FIG. 15. For example, as discussed above in two-stage optical dispersion compensation system, phase shifts of 3.48 and 2.3 are selected for the first and second optical dispersion compensators to meet the ITU 100 GHz wavelength locating requirements. From FIG. 6, the incident angles can be obtained as 2.05 degree and 1.67 degree, respectively. From FIG. 15, the two fiber separations of the dual-fiber pigtails are 0.286 mm and 0.233 mm, respectively. These two numbers match with the dual-fiber pigtail numbers of #286 and #233.

By choosing different number of the dual-fiber pigtails, the optical dispersion compensator can be adjusted with high resolution. For example, the change of the separation of the neighbor two fibers of the dual-fiber pigtail is 0.001 mm, this amount of change in the distance between the two fibers in the dual-fiber pigtail equals the change of cavity length of $(5-15\times10^{-6})*L$. For L=1 mm, the change of the cavity length is in the range of 0.005 to 0.015 $\mu$m. This amount of cavity length change means phase shift of 0.06 to 0.18, or wavelength shift of 0.008 nm to 0.024 nm. This resolution is high enough to move the two cascading dispersion compensators to their selected positions and meet the ITU wavelength locating requirements.

Figure 16:
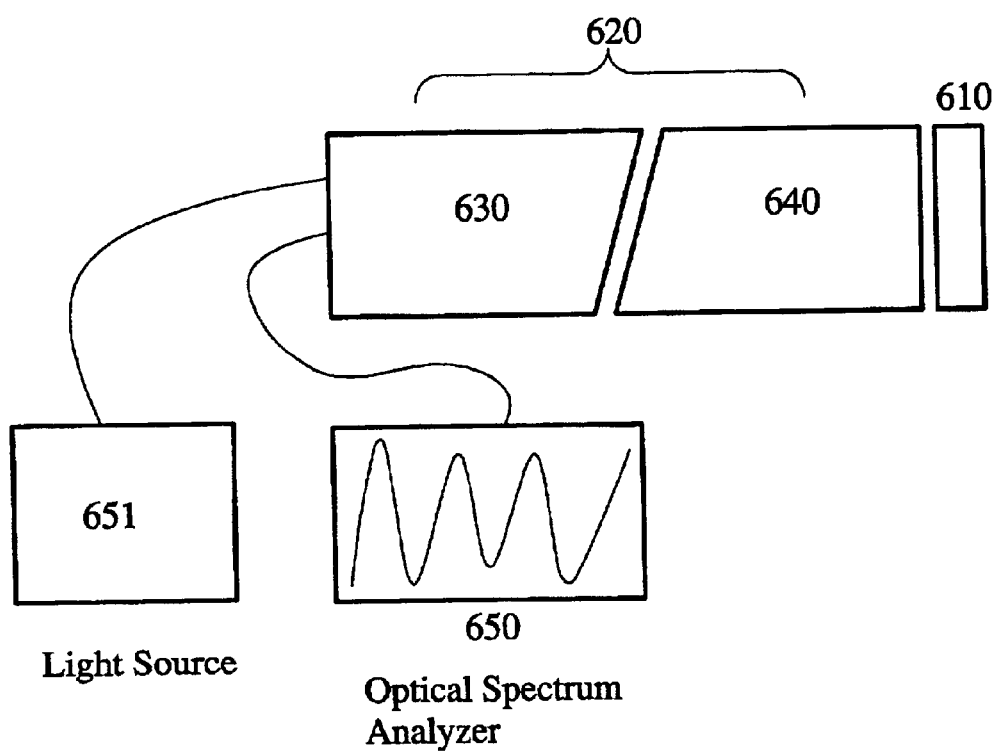
FIG. 16 is a schematic illustration of a setup for aligning and fixing the optical dispersion compensator.

As shown in FIG. 16, the dual-fiber pigtail 630 and the etalon 610 attached GRIN lens 640 will be aligned to meet the insertion loss and wavelength locating requirements. As the incident light beam has an incident angle with the etalon surface, reflected signal has loss variations, transmitted light is not required for alignment and monitoring. The inserti bn loss ripple peak can be used to indicate the group delay peak. Based on this, the group delay can be adjusted to meet the design requirements. By changing the pigtail number, the group delay peak can be located. The light signal is coming from a light source 651 and the output optical signal is analyzed by an optical spectral analyzer 650. By selecting suitable pigtail number, an ITU wavelength can be located substantially in the middle of the linear negative dispersion region. The optimization of the insertion loss can be achieved by adjusting the separation of the pigtail 630 and the GRIN lens 640.

Regarding the insertion loss (IL) and the insertion loss ripple (ILR), once the incident angle is decided, the walk-off distance can be obtained from FIG. 5. Based on the walk-off distance, the collected reflected times of the input light can be obtained. Therefore insertion loss can be derived from FIG. 7. By using the design parameters discussed above, the insertion loss of an optical dispersion compensator of the present invention can be as low as 0.25 dB, and for the two-stage optical dispersion compensation system, the insertion loss can be as low as 0.5 dB. Even plus two times of the insertion loss caused by collimator itself, the insertion is still lower than 1 dB. From Table I, it can be seen that the insertion loss ripple can be as low as 0.04 dB to 0.01 dB. By cascading two optical dispersion compensators of the present invention together, as shown in FIG. 17, following properties can be reached for FSR 100 GHz:

a) Dispersion: −100 ps/nm;

b) Bandwidth: ~50 GHz;

c) IL: ~0.5 dB; and d) ILR: ~0.1 dB.

The present invention should not be considered limited to the particular examples described above, but rather should be understood to cover all aspects of the present invention as fairly set out in the attached claims. Various modifications, equivalents, as well as numerous geometrical configurations to which the present invention may be applicable will be readily apparent to those of skill in the art to which the present invention is directed upon review of the present specification.

What is claimed is:

1. An optical dispersion compensator for a predetermined range of wavelengths, said compensator comprising:

a Fabry-Perot etalon having a front reflective mirror and a rear reflective mirror in a parallel spaced relationship to form a cavity between said reflective mirrors, the reflectivity of said front reflective mirror being substantially smaller than the reflectivity of said rear reflective mirror, said reflectivity of said rear reflective mirror being greater than 97% and less than 100%, and a dual-fiber collimator comprising a dual-fiber pigtail and a GRIN lens, said dual-fiber pigtail having an input fiber and an output fiber with a separation between said input fiber and said output fiber, wherein an optical signal is coupled into said input fiber and then collimated by said GRIN lens into a collimated incident beam which is incident on said Fabry-Perot etalon with an incident angle, said collimated incident beam is reflected back by said Fabry-Perot etalon into a collimated reflected beam which is collected by said GRIN lens and then coupled into said output fiber, such that at least one negative dispersion region is achieved.

2. The optical dispersion compensator of claim 1, wherein said negative dispersion region is a substantially linear negative dispersion region.

3. The optical dispersion compensator of claim 1, wherein said incident angle is tunable by adjusting said separation between said input fiber and output fiber, such that the phase shift of said optical dispersion compensator is adjusted and the middle wavelength of said predetermined range of wavelengths is located substantially in the middle of said negative dispersion region.

4. The optical dispersion compensator of claim 1, wherein said reflectivity of said front reflective mirror is not greater than 60%.

5. The optical dispersion compensator of claim 1, wherein said reflectivity of said front reflective mirror is not greater than 40%.

6. The optical dispersion compensator of claim 1, wherein said incident angle is greater than 0 degree and less than 5 degree.

7. The optical dispersion compensator of claim 1, wherein said incident angle is greater than 0 degree and less than 3.5 degree.

8. The optical dispersion compensator of claim 1, wherein the diameter of said GRIN lens is at least 1.8 mm.

9. The optical dispersion compensator of claim 1, wherein the diameter of said GRIN lens is at least 4 mm.

10. The optical dispersion compensator of claim 1, wherein said front reflective mirror and said rear reflective mirror are two side surfaces on a solid substrate coated with reflection films.

11. The optical dispersion compensator of claim 1, further comprising a spacer made of highly temperature stable material, wherein the end surface of said GRIN lens is used as said front reflective mirror, said rear reflective mirror is a coated mirror, said cavity is filled with air and said spacer is positioned between said front reflective mirror and said rear reflective mirror to assure the length of said cavity.

12. The optical dispersion compensator of claim 11, wherein said highly temperature stable material comprises Zerodur glass.

13. The optical dispersion compensator of claim 1, further comprising a spacer made of highly temperature stable material and a tube holding said GRIN lens, wherein said tube has a same temperature coefficient as that of said GRIN lens, the end surface of said GRIN lens is used as said front reflective mirror, said rear reflective mirror is a coated mirror, said cavity is filled with air and said spacer is positioned between the end surface of said tube and said rear reflective mirror to assure the length of said cavity.

14. The optical dispersion compensator of claim 13, wherein said highly temperature stable material comprises Zerodur glass.

15. The optical dispersion compensator of claim 1, wherein said dual-fiber pigtail is aligned with said GRIN lens to produce an insertion loss of at least as low as 0.5 dB.

16. The optical dispersion compensator of claim 1, wherein said dual-fiber pigtail is aligned with said GRIN lens to produce an insertion loss of at least as low as 0.25 dB.

17. An optical dispersion compensation system for a predetermined range of wavelengths, said system comprising:

a first optical dispersion compensator comprising:

a first Fabry-Perot etalon having a first front reflective mirror and a first rear reflective mirror in a parallel spaced relationship to form a first cavity with a first length between said first front reflective mirror and said first rear reflective mirror, the reflectivity of said first front reflective mirror being substantially smaller than the reflectivity of said first rear reflective mirror, said reflectivity of said first rear reflective mirror being greater than 97% and less than 100%, and a first dual-fiber collimator comprising a first dual-fiber pigtail and a first GRIN lens, said first dual-fiber pigtail having a first input fiber and a first output fiber with a first separation between said first input fiber and said first output fiber, and a second optical dispersion compensator comprising:

a second Fabry-Perot etalon having a second front reflective mirror and a second rear reflective mirror in a parallel spaced relationship to form a second cavity with a second length between said second front reflective mirror and said second rear reflective mirror, the reflectivity of said second front reflective mirror being substantially smaller than the reflectivity of said second rear reflective mirror, said reflectivity of said second rear reflective mirror being greater than 97% and less than 100%, and a second dual-fiber collimator comprising a second dual-fiber pigtail and a second GRIN lens, said first dual-fiber pigtail having a second input fiber and a second output fiber with a second separation between said second input fiber and second output fiber, wherein an optical signal is coupled into said first input fiber and then collimated by said first GRIN lens into a first collimated incident beam which is incident on said first Fabry-Perot etalon with a first incident angle, said first collimated incident beam is reflected back by said first Fabry-Perot etalon into a first collimated reflected beam which is collected by said first GRIN lens and then coupled into said first output fiber, the optical signal from said first output fiber is further coupled into said second input fiber and then collimated by said second GRIN lens into a second collimated incident beam which is incident on said second Fabry-Perot etalon with a second incident angle, said second collimated incident beam is reflected back by said second Fabry-Perot etalon into a second collimated reflected beam which is collected by said second GRIN lens and then coupled into said second output fiber, such that at least one negative dispersion region is achieved.

18. The optical dispersion compensation system of claim 17, wherein said negative dispersion region is a substantially linear negative dispersion region.

19. The optical dispersion compensation system of claim 17, wherein said first incident angle and said second incident angle are tunable by adjusting said first separation and second separation respectively, such that the phase shifts of said first and second optical dispersion compensators can be adjusted and the middle wavelength of said predetermined range of wavelengths is located substantially at the middle of said negative dispersion region.

20. The optical dispersion compensation system of claim 17, wherein said first output fiber and said second input fiber are the same fiber.

21. The optical dispersion compensation system of claim 17, wherein said reflectivity of said first front reflective mirror is different from said reflectivity of said second front reflective mirror.

22. The optical dispersion compensation system of claim 17, wherein said first length of said first Fabry-Perot etalon is different from said second length of said second Fabry-Perot etalon.

23. The optical dispersion compensation system of claim 17, wherein both said reflectivity of said first front reflective mirror and said reflectivity of said second front reflective mirror are not greater than 60%.

24. The optical dispersion compensation system of claim 17, wherein both said reflectivity of said first front reflective mirror and said reflectivity of said second front reflective mirror are not greater than 40%.

25. The optical dispersion compensation system of claim 17, wherein said first incident angle is different from said second incident angle.

26. The optical dispersion compensation system of claim 17, wherein both said first incident angle and said second incident angle are greater than 0 degree and less than 5 degree.

27. The optical dispersion compensation system of claim 16, wherein both said incident angle $\theta_1$ and said incident angle $\theta_2$ are greater than 0 degree and less than 3.5 degree.

28. The optical dispersion compensation system of claim 17, wherein both the diameter of said first GRIN lens and the diameter of said second GRIN lens are at least 1.8 mm.

29. The optical dispersion compensation system of claim 17, wherein both the diameter of said first GRIN lens and the diameter of said second GRIN lens are at least 4 mm.

30. The optical dispersion compensation system of claim 17, wherein said first dual-fiber pigtail is aligned with said first GRIN lens and said second dual-fiber pigtail is aligned with said second GRIN lens to produce an insertion loss of at least as low as 1 dB.

31. The optical dispersion compensation system of claim 17, wherein said first dual-fiber pigtail is aligned with said first GRIN lens and said second dual-fiber pigtail is aligned with said second GRIN lens to produce an insertion loss of at least as low as 0.5 dB.

32. A method of fabricating an optical dispersion compensator for a predetermined range of wavelengths, said method comprising:

coating the front surface and the rear surface of a etalon into a front reflective mirror and a rear reflective mirror, the reflectivity of said front reflective mirror being substantially smaller than the reflectivity of said rear reflective mirror, said reflectivity of said rear reflective mirror being greater than 97% and less than 100%, fixating a GRIN lens with said etalon, choosing a dual-fiber pigtail having a input fiber and a output fiber with a separation between said input fiber and said output fiber, aligning said dual-fiber pigtail with said GRIN lens fixated with said etalon, and fixating said dual-fiber pigtail with said GRIN lens fixated with said etalon, such that that at least one negative dispersion region is achieved.

33. The method of claim 32, wherein said negative dispersion region is a substantially linear negative dispersion region.

34. The method of claim 32, wherein said choosing a dual-fiber pigtail further comprises adjusting said separation between said input fiber and output fiber, such that the phase shift of said optical dispersion compensator is adjusted and the middle wavelength of said predetermined range of wavelengths is located substantially in the middle of said negative dispersion region.

35. The method of claim 32 further comprising machining said etalon into an adaptable size to the diameter of said GRIN lens.

36. The method of claim 32, wherein said fixating said GRIN lens with said etalon comprising applying an adhesive.

37. The method of claim 36, wherein said adhesive comprises a glue selected from a group consisting of UV glue and epoxy glue.

38. The method of claim 32, wherein said fixating said dual-fiber pigtail with said GRIN lens fixated with said etalon comprising applying an adhesive.

39. The method of claim 38, wherein said adhesive comprises a glue selected from a group consisting of UV glue and epoxy glue.

40. The method of claim 32, wherein said aligning said dual-fiber pigtail with said GRIN lens fixated with said etalon comprising coupling an light source into said input fiber and coupling the optical signal from said output fiber into an optical spectral analyzer.

41. The method of claim 32, wherein said dual-fiber pigtail is aligned with said GRIN lens to produce an insertion loss of at least as low as 0.5 dB.

42. The method of claim 32, wherein said dual-fiber pigtail is aligned with said GRIN lens to produce an insertion loss of at least as low as 0.25 dB.

43. The method of claim 32, wherein said reflectivity of said front reflective mirror is not greater than 60%.

44. The method of claim 32, wherein said reflectivity of said front reflective mirror is not greater than 40%.

45. The method of claim 32, wherein said diameter of said GRIN lens is at least 1.8 mm.

46. The method of claim 32, wherein said diameter of said GRIN lens is at least 4 mm.

* * * * *